(12) United States Patent
Lorenzi et al.

(10) Patent No.: US 12,432,407 B2
(45) Date of Patent: Sep. 30, 2025

(54) ENERGY-AWARE ABR ALGORITHM FOR GREEN HTTP ADAPTIVE VIDEO STREAMING

(71) Applicant: Bitmovin GmbH, Klagenfurt am Wörthersee (AT)

(72) Inventors: Daniele Lorenzi, Klagenfurt am Wörthersee (AT); Minh Nguyen, Klagenfurt am Wörthersee (AT); Farzad Tashtarian, Klagenfurt am Wörthersee (AT); Martin Smole, Klagenfurt am Wörthersee (AT); Roland Kersche, Klagenfurt am Wörthersee (AT); Christian Timmerer, Klagenfurt am Wörthersee (AT)

(73) Assignee: Bitmovin GmbH, Klagenfurt am Wörthersee (AT)

( * ) Notice: Subject to any disclaimer, the term of this patent is extended or adjusted under 35 U.S.C. 154(b) by 0 days.

(21) Appl. No.: 18/647,580

(22) Filed: Apr. 26, 2024

(65) Prior Publication Data

US 2024/0305848 A1 Sep. 12, 2024

Related U.S. Application Data

(63) Continuation-in-part of application No. 18/116,760, filed on Mar. 2, 2023, now abandoned.

(60) Provisional application No. 63/442,885, filed on Feb. 2, 2023.

(51) Int. Cl.
*H04N 21/2662* (2011.01)
*H04N 21/24* (2011.01)

(52) U.S. Cl.
CPC ......... *H04N 21/2662* (2013.01); *H04N 21/24* (2013.01)

(58) Field of Classification Search
CPC ............... H04N 21/2662; H04N 21/24; H04N 21/4436; H04N 21/8456; H04N 21/44004; H04N 21/23439
USPC .......................................................... 709/231
See application file for complete search history.

(56) References Cited

U.S. PATENT DOCUMENTS

| 10,771,855 B1 | 9/2020 | Joliveau et al. |
| 2015/0333951 A1 | 11/2015 | Yeom et al. |
| 2022/0124141 A1 | 4/2022 | Ramanujam et al. |
| 2022/0264168 A1* | 8/2022 | Dahl ................ H04N 21/23439 |

* cited by examiner

*Primary Examiner* — Adil Ocak
(74) *Attorney, Agent, or Firm* — Marton Ribera Schumann & Chang LLP; Chien-Ju Alice Chuang (57) ABSTRACT

Techniques for implementing an energy-aware ABR algorithm for adaptive streaming may include determining whether a buffer level is less than a threshold buffer, selecting a lowest bitrate representation for playback of a segment of a video in a conservative mode when the buffer level is less than the threshold buffer, calculating a cost of a representation in an operative mode when the buffer level exceeds the threshold buffer, the cost of the representation comprising a weighted sum of a throughput cost, a buffer cost, a quality cost, and optionally also an energy cost, selecting a bitrate for a next segment of the video based on the cost of the representation, and providing to a client device a selected representation. The energy-aware ABR algorithm may be implemented when an ECO mode is selected in a client device.

19 Claims, 5 Drawing Sheets

ENERGY-AWARE ABR ALGORITHM FOR GREEN HTTP ADAPTIVE VIDEO STREAMING

CROSS-REFERENCE TO RELATED APPLICATIONS

This application is a continuation-in-part of U.S. patent application Ser. No. 18/116,760 titled "ECO Mode for HAS Clients," filed Mar. 2, 2023, which claims priority to U.S. Provisional Patent Application No. 63/442,885 titled "ECO Mode for HAS Clients," filed Feb. 2, 2023, the contents of which are hereby incorporated by reference in their entirety.

BACKGROUND OF INVENTION

HTTP Adaptive Streaming (HAS) has grown to become the de facto standard for delivering video over the Internet. However, the carbon footprint of streaming video has grown with its popularity. The transmission of large amounts of data over wifi and broadband are large contributors to the resulting emission of greenhouse gases (e.g., $CO_2$). Modern mobile networks (e.g., 5G) are more efficient and climate-friendly than older generation networks, and wired broadband infrastructure (e.g., fiber and copper) are more energy efficient than radio for mobile networks. However, working against this more efficient infrastructure is the increase in resolution to Ultra HD, which has resulted in a corresponding increase in greenhouse gas emissions due to the increased volume of data being transmitted.

ABR algorithms typically prioritize video quality, ignoring the energy impact of their decisions. Consequently, they often select the video representation with the highest bitrate under good network conditions, thereby increasing energy consumption. This is problematic, especially for energy-limited devices, as it can affect a device's battery life and the user experience.

Thus, it is desirable for an energy-aware ABR algorithm for green adaptive streaming that limits the amount of data being transmitted for video streaming.

BRIEF SUMMARY

The present disclosure provides techniques for an energy-aware ABR algorithm for adaptive video streaming. A method for implementing an energy-aware ABR algorithm may include: determining whether a buffer level is less than a threshold buffer; when the buffer level is less than the threshold buffer, selecting a lowest bitrate representation for playback of a segment of a video in a conservative mode; when the buffer level exceeds the threshold buffer, calculating a cost of a representation for each of a set of bitrates in an operative mode, the cost of the representation comprising a weighted sum of a throughput cost, a buffer cost, a quality cost, and an energy cost; while in the operative mode, selecting a bitrate from the set of bitrates for a next segment of the video based on the cost of the representation; and providing to a client device a selected representation based on the selected bitrate, the selected bitrate being the lowest bitrate representation in the conservative mode and the bitrate selected based on the cost of the representation in the operative mode. In some examples, the energy cost is computed as a function of the representation's bitrate, the representation's content resolution, and the representation's frames per second. In some examples, the representation's content resolution comprises a number of pixels of the representation. In some examples, the energy cost is derived from an energy consumption model wherein each of the representation's bitrate, the representation's content resolution, and the representation's frames per second is given a weight based on characteristics of the client device. In some examples, the energy cost is further computed as a function of one, or a combination of, a codec, a device type, and a segment size. In some examples, the device type comprises a property associated with a brightness of a screen of the client device. In some examples, the device type comprises a property associated with a display resolution of the client device. In some examples, the device type comprises a property associated with a network interface of the client device. In some examples, the function comprises a linear function. In some examples, the energy cost comprises an empirical value.

In some examples, the throughput cost is computed as a linearly increasing function of the representation's bitrate and a segment duration. In some examples, the buffer cost is computed as a function of a total buffer size, the threshold buffer, a segment duration, and an estimated throughput for downloading the next segment. In some examples, the quality cost comprises one or both of a penalty when the representation's bitrate is lower than the highest bitrate in the set of bitrates, and a penalty if the representation's bitrate is different from an average quality of a set of recent segments. In some examples, the quality cost is computed as an exponential function of a quality of the representation and an average quality of a set of recent segment. In some examples, the conservative mode is implemented in response to a selection of an ECO mode by an ABR application on a client device. In some examples, the energy-aware ABR algorithm is implemented in response to a selection of an ECO mode by an ABR application on a client device, the conservative mode and the operative mode comprising sub-modes of the ECO mode. In some examples, the sum of the weights for the throughput cost, the buffer cost, and the quality cost is set to 1. In some examples, the throughput cost and the buffer cost have the same contribution to the cost of the representation for a highest bitrate representation. In some examples, the set of bitrates in the operative mode comprise bitrates that are less than the highest bitrate for a last throughput with a given margin.

BRIEF DESCRIPTION OF THE DRAWINGS

Various non-limiting and non-exhaustive aspects and features of the present disclosure are described hereinbelow with references to the drawings, wherein.

DETAILED DESCRIPTION

The proposed invention comprises a selectable ecologically beneficial mode (i.e., ECO mode) for an energy-aware ABR algorithm for green adaptive streaming (e.g., HTTP Adaptive Streaming (HAS)) that restricts quality measures and their respective levels in order to reduce the amount of electricity consumed to transmit a video content, thereby reducing the resulting $CO_2$ emissions. In an example, a video streaming end user may opt-in to, or opt-out of, ECO mode, depending on whether ECO mode is a default mode. In some examples, ECO mode may be configured to limit the streaming bandwidth. This can be easily done by simply restricting the streamed resolution up to a given max, e.g., 720p which will still display well on 4 k TV displays without a corresponding loss in quality. Streaming in 720p instead of Ultra HD (e.g., 4 k resolution) saves about 10 times the data volume streamed. The invention would therefore reduce the streaming bandwidth and thus also CO2 emissions by a factor of 10 compared to Ultra HD streaming.

In some examples, an ECO mode input or selection may comprise an algorithm to restrict the streamed rendition by resolution and/or bandwidth. In other examples, there are more advanced techniques possible. A limit on resolution and/or bandwidth may be dependent on the network (mobile, wired, fiber, etc.). In other examples, a limit might also be dependent on a device type or characteristics, screen size or characteristics, and other factors (e.g., mobile devices may not need higher resolution, 4 k TV might benefit from higher resolutions).

By reducing the end user's carbon footprint, overall user experience is improved related to the consumption of such video content. This may have the added benefit of cost saving for the video content provider as the invention will reduce the data traffic associated with the video stream, and thus the bandwidth and CDN costs.

An exemplary energy-aware ABR algorithm may be based on a weighted sum model for HAS. The weighted sum model may take into account a plurality of cost factors of each video representation, including (a) throughput cost, (b) buffer cost, and (c) quality cost. In some embodiments, the weighted sum model may further account for another cost factor—(d) energy cost. The throughput cost may indicate an amount of downloaded data (e.g., data usage of a mobile device). The buffer cost and quality cost may represent the stalling risk and deterioration in quality of a representation, respectively. For example, a low-quality representation with a small bitrate provides a low throughput cost due to less data delivered in broadband networks and a low buffer cost due to less time to download, resulting in a low risk of stalling events. An representation with a lowest overall cost for a certain time may be chosen to provide an optimal segment bitrate. Each cost may have a specific impact on the overall cost function described herein. In some examples, an end user also may express preferences by setting corresponding weights. The weighted sum model described herein may be configured to map an end user's needs to said weighted costs. Algorithm 1 below is an exemplary energy-aware ABR algorithm:

---
Algorithm 1: Energy-aware Weighted Sum Model for HAS (E-WISH) ABR algorithm
---

1   if $B_n < B_l$ then
2   |_ $R_s = R_l$;
3   else
4   |
$$\overline{Q_k} = \frac{1}{k}\sum_{i=0}^{k-1} Q_{n-1};$$

5   |   m = 2;
6   |   M = max{i|$R_i < T_n \times (1 + \mu)$, m ≤ i ≤ N} ;
7   |   for i = m, m + 1, ... , M do;

8   |   |
9   |   |   $C_t(i) = \frac{R_i}{T_e};$
10   |   |

$$C_b(i) = \frac{R_i \times \tau}{(B_n - B_l) \times T_e};$$

$$C_q(i) = \frac{e^{[q(N) - q(i)] + [\overline{Q_k} - q(i)]}}{e^{2 \times q(N) - 2 \times q(1)}};$$

11   |   |   $C_e(i) = w_1 \times f_i + w_2 \times r_i + w_3 \times R_i$ ;
12   |   |_ $C(i) = \alpha \times C_t(i) + \beta \times C_b(i) + \gamma \times C_q(i) + \delta \times C_e(i)$ ;
13   |   $j_{min}$ = arg min C(j) ;
              j ∈ {m, ... , M}
14   |_ $R_s = R_{j_{min}}$ ;
15   return $R_s$

TABLE 1

Notations

| Notation | Definition |
|---|---|
| N | Number of representations |
| R | Set of incrementally ordered available bitrates / representations<br>R + {$R_1, \ldots, R_N$}, where $R_N$ has the highest bitrate |
| τ | Segment duration (e.g., in seconds) |
| q(i) | Quality of representation i |
| $Q_n$ | Quality of segment n |
| $\overline{Q_k}$ | Average quality of the last k downloaded segments |
| $T_n$ | Average measured throughput before downloading segment n |
| $T_e$ | Estimated throughput for downloading the next segment n |
| B | Total buffer size |
| $B_l$ | Threshold of low buffer occupancy |
| $B_n$ | Current buffer level before downloading next segment n |
| $r_i$ | Resolution of representation i |
| $f_i$ | Frames per second of representation i |
| C(i) | Total cost of representation i |
| $C_t(i)$ | Throughput cost of representation i |
| $C_b(i)$ | Buffer cost of representation i |
| $C_q(i)$ | Quality cost of representation i |
| $C_e(i)$ | Energy cost of representation i |

The weighted sum model may select a bitrate $R_s$ for a segment according to mode selected from at least two possible modes. An exemplary conservative mode may be selected and implemented by the weighted sum model if a current buffer level before downloading a next segment n (denoted as $B_n$) is less than a predefined threshold $B_l$ because the buffer is in a dangerous zone with a high stall possibility. In this case, the weighted sum model selects the lowest representation, $R_1$, to start playback as fast as possible at the beginning of a streaming session and to decrease the risk of stalling. An exemplary operative mode may be selected and implemented by the weighted sum model if a current buffer level exceeds $B_l$. In this case, the weighted sum model may calculate a cost of a video representation i, C(i), according to one or more formulas described herein. The overall cost C(i) may be a weighted sum of throughput cost $C_t(i)$, buffer cost $C_b(i)$, and quality cost $C_q(i)$, plus an energy cost $C_e(i)$, as presented in Equation 1, the weights $\alpha$, $\beta$, $\gamma$, and $\delta$ are positive numbers:

$$C(i) = \alpha \times C_t(i) + \beta \times C_b(i) + \gamma \times C_q(i) + \delta \times C_e(i) \tag{1}$$

In an alternative embodiment, overall cost $C(i)$ may be a weighted sum of throughput cost $C_t(i)$, buffer cost $C_b(i)$, and quality cost $C_q(i)$, without including consideration of an energy cost $C_e(i)$.

Estimating throughput $T_e$ according to the weighted sum model, a throughput cost $C_t(i)$ of representation i may be calculated as a linearly increasing function of its bitrate $R_i$ as follows:

$$C_t(i) = \frac{R_i}{T_e} \tag{2}$$

In an operative mode, to cope with throughput oscillations, the weighted sum model may consider a subset of representations whose bitrates $R_i$ are less than a last throughput $T_n$ with the margin $\mu$ (e.g., $\mu=0.1$), for example in line 6 of Algorithm 1. Various other known methods of throughput estimation also may be used.

The buffer cost $C_b(i)$ may be defined based on the following observations. While downloading representation i with bitrate $R_i$, the buffer may be drained by the download time, which may be $$\frac{R_i \times \tau}{T_e},$$

where $\tau$ is a segment duration. The longer the download time, the more the buffer is decreased. Additionally, with the same download time, a buffer at a low level has a higher risk of under-running, which may result in a stall event. Therefore, the buffer cost of representation i may be computed as:

$$C_b(i) = \frac{R_i \times \tau}{(B_n - B_l) \times T_e} \tag{3}$$

The quality cost may comprise two sub-penalties: (i) a penalty when a representation is lower than the highest-bitrate representation, and (ii) a penalty if it is different from the average quality of recent segments. To make the quality cost positive, we may use an exponential function:

$$C_q(i) = \frac{e^{[q(N)-q(i)]+[\overline{Q_k}-q(i)]}}{e^{2 \times q(N)-2 \times q(1)}} \tag{4}$$

where $q(i)$ is the quality of representation i, and $\overline{Q_k}$ is the average quality of the last k segments (default k=10), as defined in line 4 of Algorithm 1. In some examples, bitrate $R_i$ may be used to calculate the quality of the i-th representation as:

$$q(i) = \frac{R_i}{R_N} \tag{5}$$

Finally the energy cost $C_e(i)$ of representation i may be defined as a linear function of its bitrate $R_i$, content resolution $r_i$ (number of overall pixels), and frames per second $f_i$:

$$C_e(i) = w_1 \times f_i + w_2 \times r_i + w_3 \times R_i \tag{6}$$

where each $w_i$ with i=1, . . . , 3 is a model parameter specific to an end-user device. Energy consumption models are known in the art and may be used to determine or derive the importance given to each weight $w_i$ relative to the type of client device (e.g., personal computer, laptop, smartphone, etc.). In other examples, energy cost $C_e(i)$ of representation i may be defined by a different function (e.g., linear or non-linear). In an example, energy cost $C_e(i)$ may consider one or more of the following parameters in addition to the above parameters: a codec being used, a device type, and a segment size. For example, audio, video, and/or other types of codecs that may be used (e.g., AVC, HEVC, VVC, VP9, AV1, etc.) may be represented in the energy cost function as a parameter (i.e., with a corresponding weight). In some examples, a given codec may be associated with a predetermined empirical value. In other examples, a codec parameter may be computed as a function of, or relative to, other parameters. In still other examples, a codec parameter may be obtained by other methods (e.g., predicted). In some examples, a device type parameter may comprise one or more properties, including one or a combination of a network interface (e.g., ethernet, 4G, 5G, wifi, and other wired and wireless networks), device or display resolution (e.g., CPU and GPU availability for various quality enhancement methods, AI-based or otherwise, such as spatial/temporal super-resolution, denoising, artifact removal, film grain, etc.), and brightness of a screen/display.

In some examples, weights described herein may be dynamically set according to a video's characteristics. For example, weights may be determined by making a maximum bitrate own the lowest cost under a set of given conditions (e.g., estimated throughput is high enough compared to a maximum bitrate to avoid buffer drainage, average quality of last segments is high to indicate recent network condition is favorable, and current buffer is high to prevent stall events in case of sudden throughput drop. In some examples, the sum of a subset (e.g., throughput, buffer, and quality) or all of the weights may be set to 1. In some examples, throughput and buffer costs also may have the same contribution in the overall cost of a highest representation, such that:

$$\beta = \alpha \times \frac{\xi \times B - B_l}{\tau} \tag{7}$$

In some examples, the energy cost function may be set to an empirical value. In other examples, the energy cost function may be determined dynamically.

In some examples, the conservative mode described herein may be used when an ECO mode for HAS clients is selected. In other examples, both the conservative mode and the operative mode of an energy-aware ABR algorithm, as described herein, may comprise sub-modes of the ECO mode for HAS clients described herein, wherein a non-ECO mode comprises implementing a separate ABR algorithm.

Figure 1:
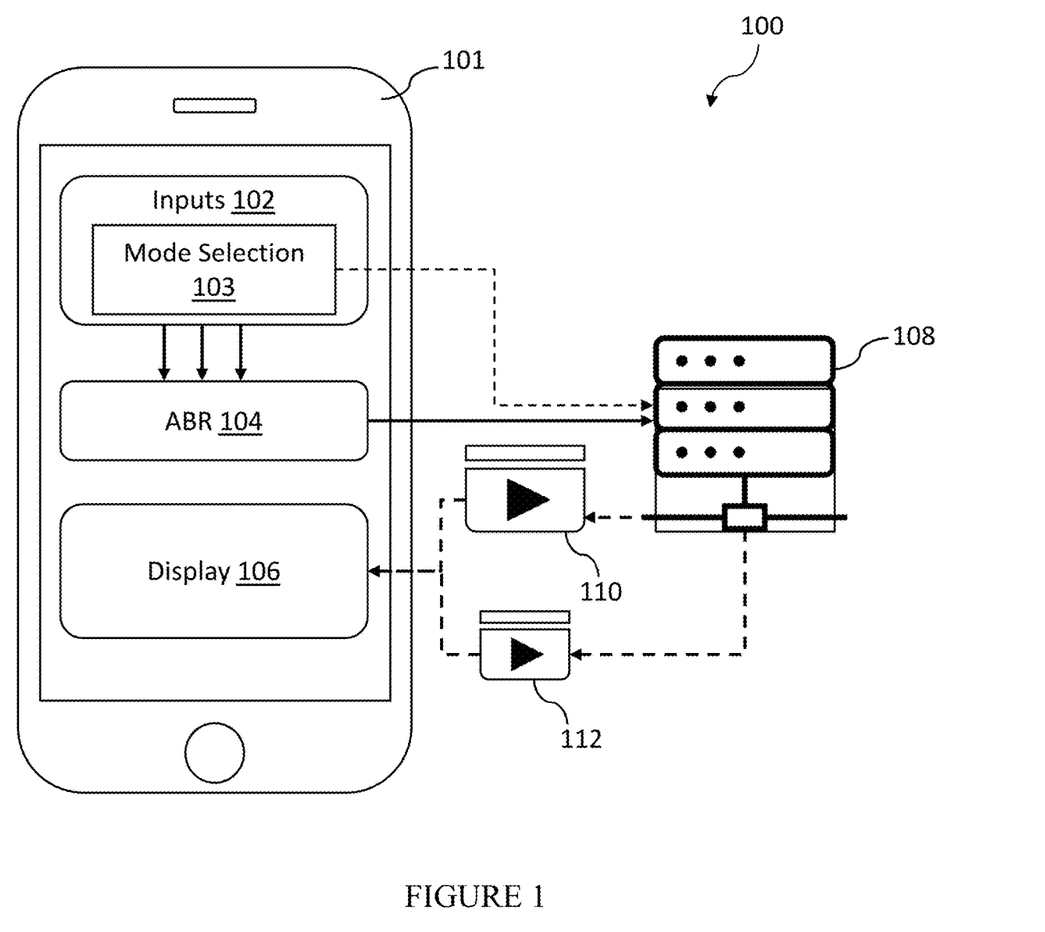
FIG. 1 is a simplified block diagram showing an exemplary system for implementing an ECO Mode for HAS clients, in accordance with one or more embodiments.

FIG. 1A is a simplified block diagram showing a system for implementing an ECO mode for HAS clients, in accordance with one or more embodiments. System 100 includes mobile device 101 (e.g., client) and server 108. Mobile device 101 may comprise an adaptive bitrate (ABR) application 104, an application configured to receive inputs and to determine a quality of representation of a video to request from server 108 based on inputs 102. Inputs 102 may include a mode selection 103, among other inputs such as bandwidth availability, buffer status, device battery level, device type or characteristics, screen size or characteristics, and the like. In some examples, mode selection 103 may allow a user to select an ECO mode where ECO mode is not a default mode (e.g., mode selection 103 may comprise an application configured to enable a user to make a mode selection) configured to cause ABR 104 to select from a limited range of resolutions when determining an optimal resolution. In other examples, mode selection 103 may automatically select ECO mode under certain conditions relating to other inputs 102, thereby causing ABR 104 to select from a limited range of resolutions to determine an optimal resolution. In still other examples, ECO mode may be the default mode and mode selection 103 allows a user to select a different mode or opt-out of ECO mode.

In still other examples, a selection or indication of ECO mode by mode selection 103 may cause ABR 104 or other applications to limit the resolution of received video in other ways. For example, ABR 104 may determine an optimal resolution for a video segment from a full range of resolutions, and prior to requesting the video segment, ABR 104 or another application may compare the optimal resolution with the ECO mode resolution limit and reduce the resolution identified in the video segment request accordingly. In another example, mode selection 103 may provide an indication of an ECO mode selection directly to server 108 or other node as input to another ABR for selection of an optimal resolution according to ECO mode resolution limits.

Mobile device 101 also may include display 106 configured to display and/or playback video or video segment representations 110 and 112. The videos being played on display 106 may be at a given video resolution (e.g., video 110 may be a higher resolution representation, video 112 may be a lower resolution representation). In some examples, server 108 or other networked storage device may provide higher resolution representation video 110 and/or lower resolution representation video 112 depending on a determination of an optimal resolution by ABR 104. In other examples, the optimal resolution may be determined at server 108 based on input from mode selection 103 and/or ABR 104.

Figure 2:
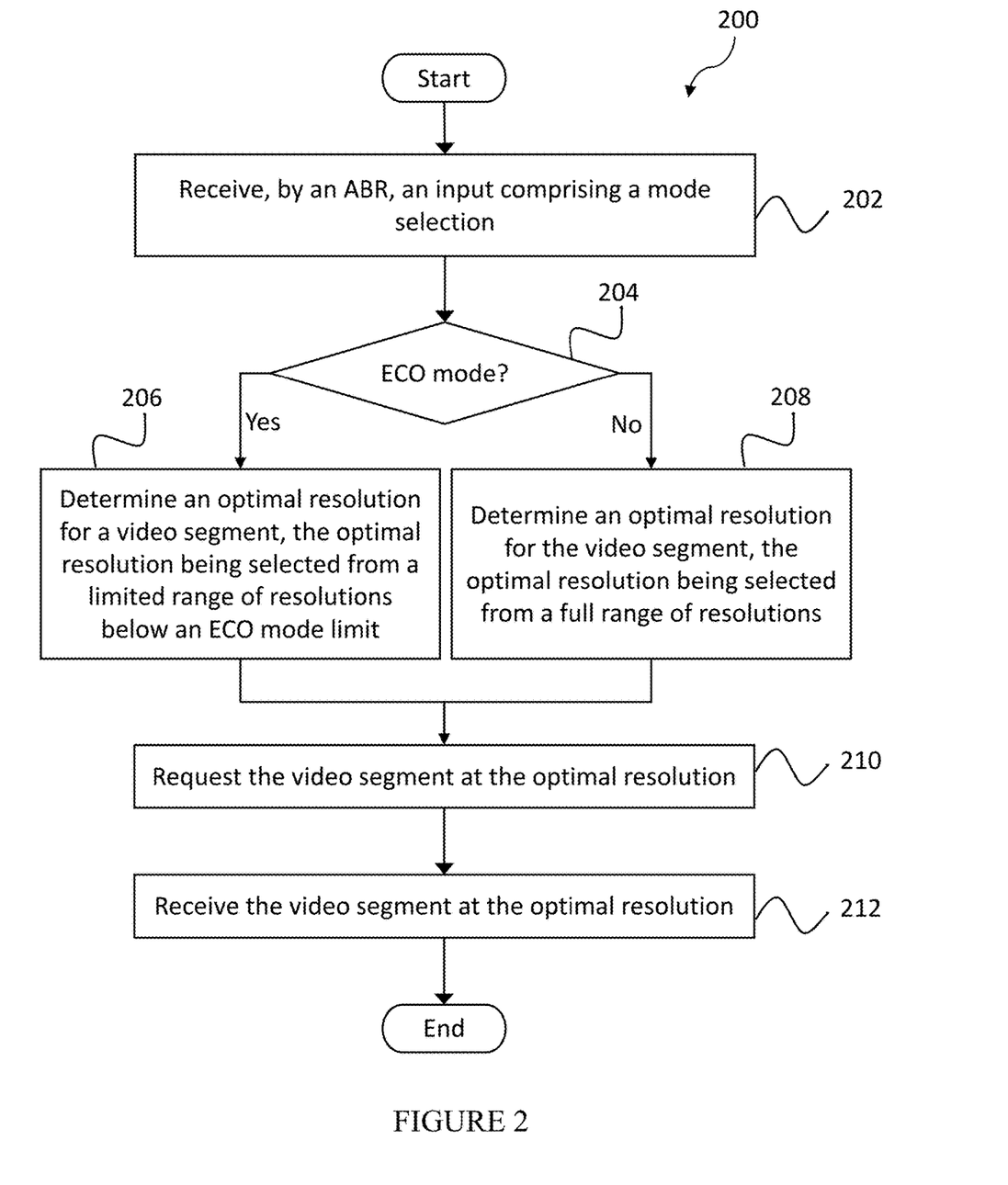
FIG. 2 is a flow diagram illustrating an exemplary method for implementing ECO Mode for HAS clients, in accordance with one or more embodiments.

FIG. 2 is a flow diagram illustrating an exemplary method for implementing an ECO Mode for HAS clients, in accordance with one or more embodiments. Method 200 may begin with receiving, by an ABR application, an input comprising a mode selection at step 202. At step 204, a decision is made whether the mode selection is an ECO mode or not. In some examples, ECO mode may be selected, automatically or manually, wherein ECO mode is not the default mode. In other examples, ECO mode may be a default mode and may be de-selected, automatically or manually, when it is not beneficial or desired (e.g., according to an energy-aware ABR algorithm, as described herein). If yes, an optimal resolution for a video segment is determined, the optimal resolution being selected from a limited range of resolutions below an ECO mode limit at step 206. If no, then the optimal resolution is determined for the video segment, the optimal resolution being selected from a full range of resolutions at step 208. The video segment at the determined optimal resolution may be requested at step 210, for example, from a server or other networked node or device from which representations of the video segment may be requested. The video segment (e.g., a representation of the video segment) may be received at the optimal resolution at step 212, in response to said request in step 210.

Figure 3:
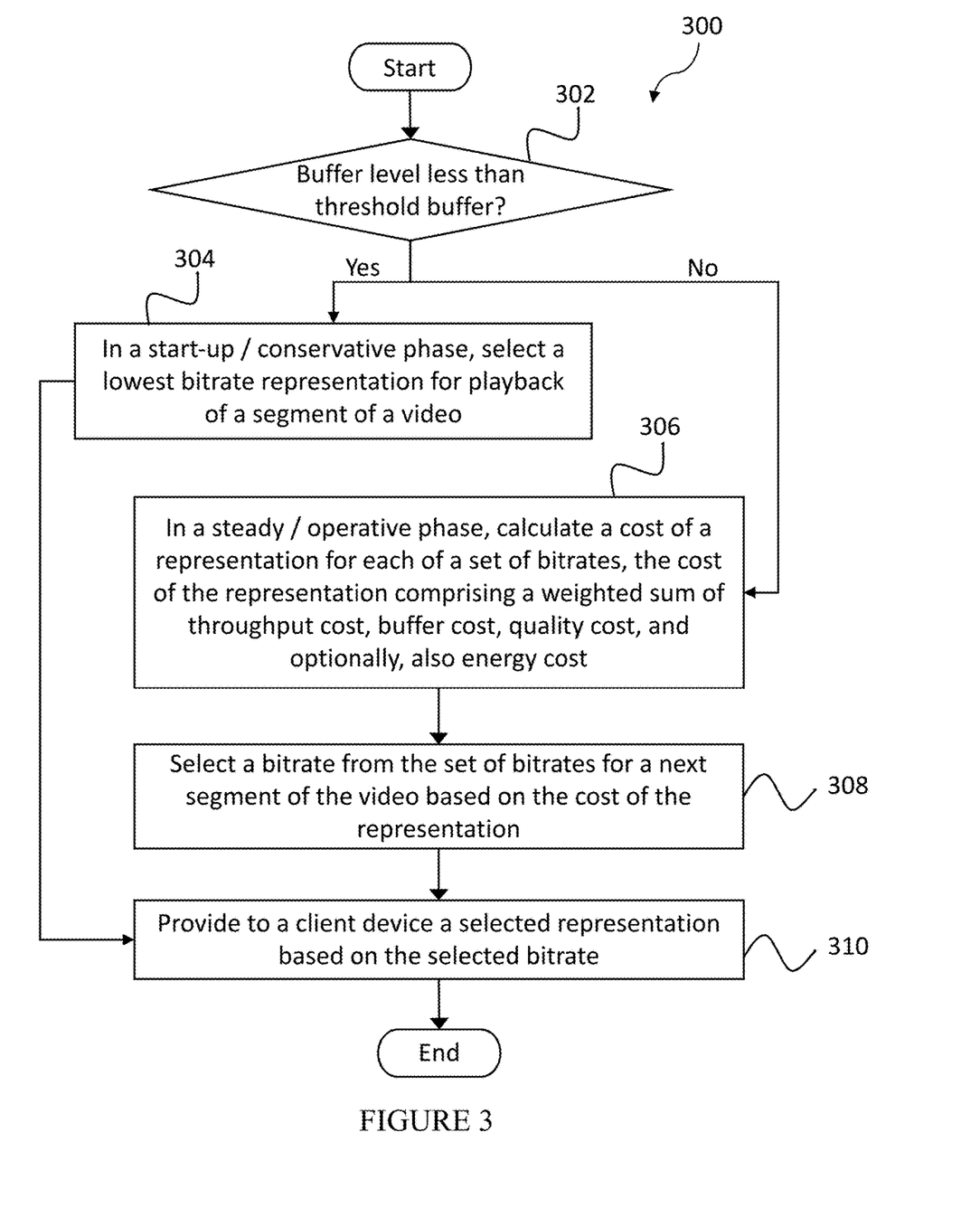
FIG. 3 is a flow diagram illustrating an exemplary method for implementing energy-aware ABR algorithm for green adaptive streaming using a weighted sum model, in accordance with one or more embodiments.

FIG. 3 is a flow diagram illustrating an exemplary method for implementing energy-aware ABR algorithm for green adaptive streaming using a weighted sum model, in accordance with one or more embodiments. Method 300 may begin with determining whether a buffer level is less than a threshold buffer (e.g., threshold of low buffer occupancy) at step 302. If yes, the buffer may be in danger of stalling (i.e., a high stall possibility), therefore the energy-aware ABR algorithm may initiate a start-up or conservative phase (i.e., mode), wherein a lowest bitrate representation may be selected for playback of a segment of a video at step 304. Once the (i.e., current) buffer level exceeds the threshold buffer, the energy-aware ABR algorithm may implement a steady or operative phase or mode, wherein selection of a representation is based on a cost of a representation. Thus, at step 306 a cost of a representation for each of a set of bitrates may be calculated, the cost of the representation comprising a weighted sum of throughput cost, buffer cost, and quality cost. In some examples, the cost of the representation also may include an energy cost. In some examples, the energy-aware ABR algorithm may limit the set of representations considered to representations whose bitrates are less than the last throughput with a given margin. In some examples, the throughput cost may be computed as a linearly increasing function of its bitrate and segment duration. In some examples, the buffer cost may be computed as a function of a total buffer size, a threshold buffer, a segment duration, and an estimated throughput for downloading a next segment. In some examples, the quality cost may comprise one or both of (a) a penalty when a representation is lower than the highest-bitrate representation, and (b) a penalty if it is different from the average quality of a set of recent segments. In some examples the quality cost may be computed as a function (e.g., exponential function) of the quality of the representation and an average quality of the set of recent segments (e.g., last k segments). In some examples, the energy cost may be computed as a linear function of its bitrate, content resolution, and frames per second. The energy-aware ABR algorithm may select a bitrate from the set of bitrates for a next segment of the video based on the cost of the representation at step 308. The cost of the representation may be used in a variety of ways to select the bitrate (e.g., lowest cost, the highest quality below a threshold cost, other methods to decrease the risk of stalls and improve quality of experience (QoE)). Then a selected representation may be provided to the client based on the selected bitrate at step 310. In some examples, method 300 may be implemented by an ABR application on a client device (e.g., ABR 104 on mobile device 101) using inputs from both a server and the client device. In other examples, method 300 may be implemented by the server. In still other examples, method 300 may be implemented by a combination of the server and the client device.

Figure 4A:
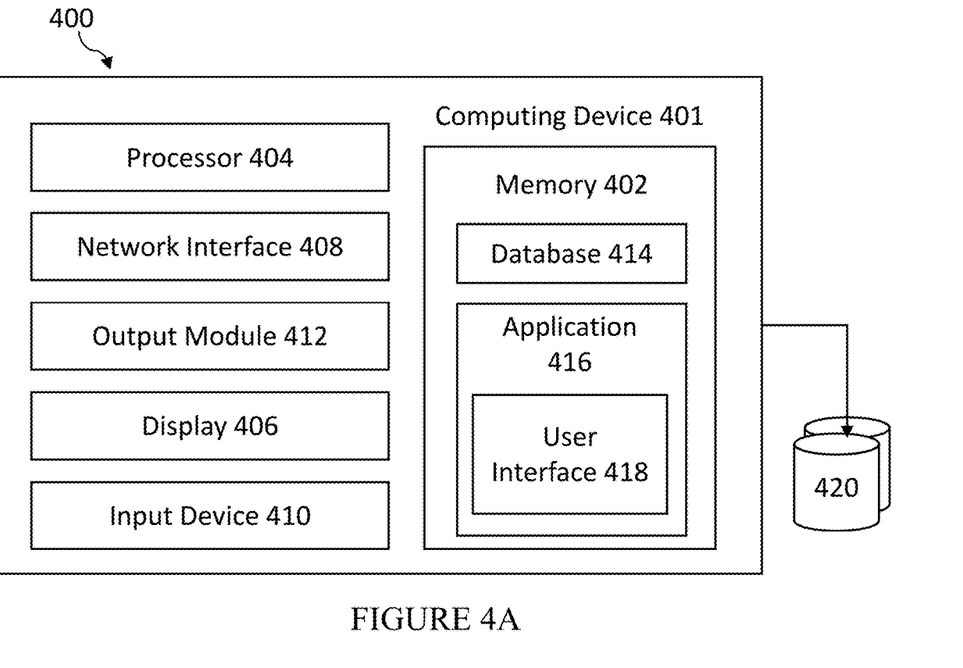
FIG. 4A is a simplified block diagram of an exemplary computing system implemented by the system illustrated in FIG. 1 and configured to perform steps of the method illustrated in FIGS. 2-3, in accordance with one or more embodiments.

FIG. 4A is a simplified block diagram of an exemplary computing system implemented by the system illustrated in FIG. 1 and configured to perform steps of the method illustrated in FIGS. 2-3, in accordance with one or more embodiments. In one embodiment, computing system 400 may include computing device 401 and storage system 420. Storage system 420 may comprise a plurality of repositories and/or other forms of data storage, and it also may be in communication with computing device 401. In another embodiment, storage system 420, which may comprise a plurality of repositories, may be housed in one or more of computing device 401. In some examples, storage system 420 may store networks, video data, bitrate ladders, ABR algorithms, instructions, programs, and other various types of information as described herein. This information may be retrieved or otherwise accessed by one or more computing devices, such as computing device 401, in order to perform some or all of the features described herein. Storage system 420 may comprise any type of computer storage, such as a hard drive, memory card, ROM, RAM, DVD, CD-ROM, write-capable, and read-only memories. In addition, storage system 420 may include a distributed storage system where data is stored on a plurality of different storage devices, which may be physically located at the same or different geographic locations (e.g., in a distributed computing system such as system 450 in FIG. 4B). Storage system 420 may be networked to computing device 401 directly using wired connections and/or wireless connections. Such network may include various configurations and protocols, including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

Computing device 401, which in some examples may be included in mobile device 101 and in other examples may be included in server 108, also may include a memory 402. Memory 402 may comprise a storage system configured to store a database 414 and an application 416. Application 416 (e.g., ABR 104, display 106, mode selection 103, or other applications described herein) may include instructions which, when executed by a processor 404, cause computing device 401 to perform various steps and/or functions (e.g., implementing an energy-aware ABR algorithm), as described herein. Application 416 further includes instructions for generating a user interface 418 (e.g., graphical user interface (GUI)). Database 414 may store various algorithms (e.g., ABR algorithms, mode selection algorithms) and/or data, including neural networks (e.g., neural networks trained to make ABR selections) and data regarding bitrates, videos, device characteristics, among other types of data. Memory 402 may include any non-transitory computer-readable storage medium for storing data and/or software that is executable by processor 404, and/or any other medium which may be used to store information that may be accessed by processor 404 to control the operation of computing device 301.

Computing device 401 may further include a display 406 (e.g., similar to display 106), a network interface 408, an input device 410, and/or an output module 412. Display 406 may be any display device by means of which computing device 401 may output and/or display data. Network interface 408 may be configured to connect to a network using any of the wired and wireless short range communication protocols described above, as well as a cellular data network, a satellite network, free space optical network and/or the Internet. Input device 410 may be a mouse, keyboard, touch screen, voice interface, and/or any or other hand-held controller or device or interface by means of which a user may interact with computing device 401. Output module 412 may be a bus, port, and/or other interfaces by means of which computing device 401 may connect to and/or output data to other devices and/or peripherals.

In one embodiment, computing device 401 is a data center or other control facility (e.g., configured to run a distributed computing system as described herein), and may communicate with a media playback device (e.g., mobile device 101). As described herein, system 400, and particularly computing device 401, may be used for video playback, running an energy-aware ABR application, selecting a representation or bitrate, providing feedback to a server, and otherwise implementing steps in implementing an energy-aware ABR algorithm for adaptive streaming, as described herein. Various configurations of system 400 are envisioned, and various steps and/or functions of the processes described below may be shared among the various devices of system 400 or may be assigned to specific devices.

Figure 4B:
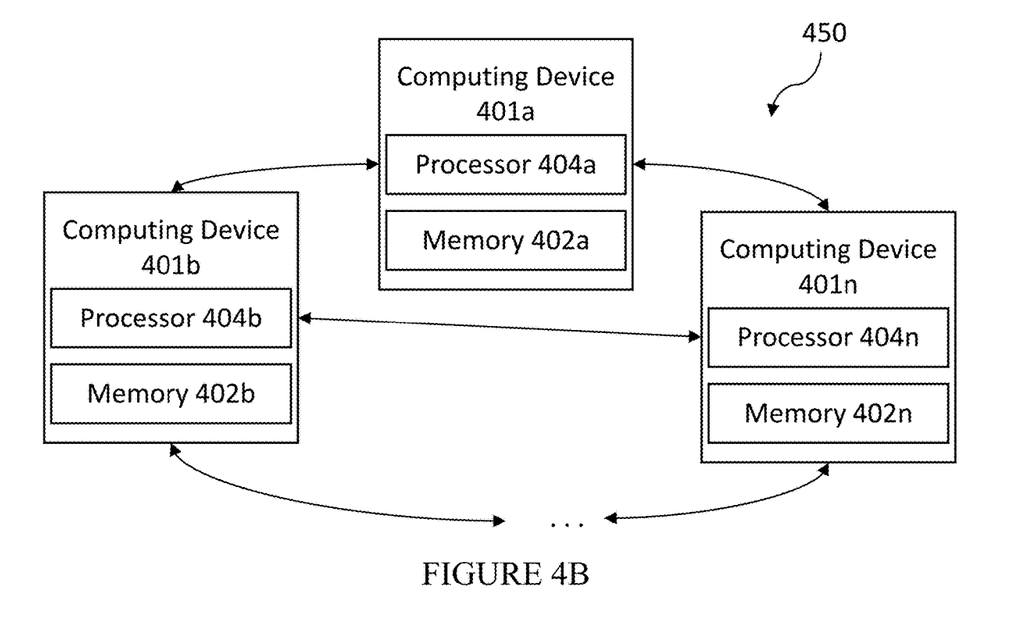
FIG. 4B is a simplified block diagram of an exemplary distributed computing system implemented by a plurality of the computing devices in FIG. 4A, in accordance with one or more embodiments.

FIG. 4B is a simplified block diagram of an exemplary distributed computing system implemented by a plurality of the computing devices in FIG. 4A, in accordance with one or more embodiments.

System 450 may comprise two or more computing devices 401*a-n*. In some examples, each of 401*a-n* may comprise one or more of processors 404*a-n*, respectively, and one or more of memory 402*a-n*, respectively. Processors 404*a-n* may function similarly to processor 404 in FIG. 4A, as described above. Memory 402*a-n* may function similarly to memory 402 in FIG. 4A, as described above.

Figure 5A:
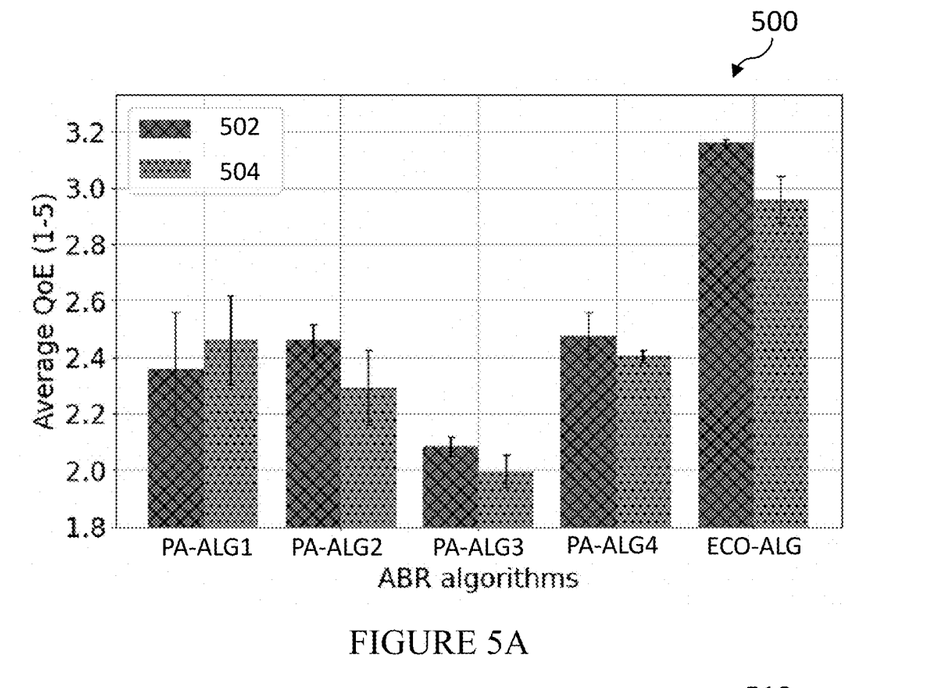
FIGS. 5A-5B are charts illustrating the quality of experience and energy consumption benefits of an energy-aware ABR algorithm over existing prior art ABR algorithms.
Figure 5B:
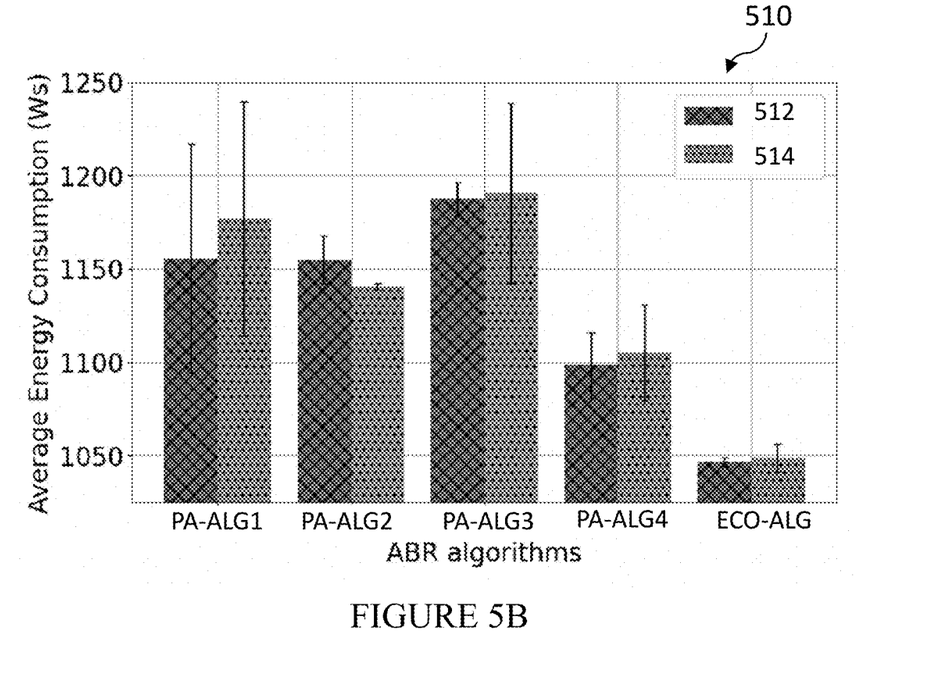

FIGS. 5A-5B are charts illustrating the quality of experience and energy consumption benefits of an energy-aware ABR algorithm over existing prior art ABR algorithms. In chart 500, average quality of experience (QoE) for video samples 502 and 504 are shown for an energy-aware ABR algorithm according to the methods described herein (ECO-ALG) in comparison to several prior art ABR algorithms (PA-ALG1, PA-ALG2, PA-ALG3, and PA-ALG4). As shown, there is a significant increase in QoE when implementing ECO-ALG. In chart 510, energy consumption for video samples 512 and 514 are shown for ECO-ALG in comparison to the same prior art ABR algorithms. As shown, there is a significant decrease in energy consumption when implementing ECO-ALG.

While specific examples have been provided above, it is understood that the present invention can be applied with a wide variety of inputs, thresholds, ranges, and other factors, depending on the application. For example, the time frames, rates, ratios, and ranges provided above are illustrative, but one of ordinary skill in the art would understand that these time frames and ranges may be varied or even be dynamic and variable, depending on the implementation.

As those skilled in the art will understand a number of variations may be made in the disclosed embodiments, all without departing from the scope of the invention, which is defined solely by the appended claims. It should be noted that although the features and elements are described in particular combinations, each feature or element can be used alone without other features and elements or in various combinations with or without other features and elements. The methods or flow charts provided may be implemented in a computer program, software, or firmware tangibly embodied in a computer-readable storage medium for execution by a general-purpose computer or processor.

Examples of computer-readable storage mediums include a read only memory (ROM), random-access memory (RAM), a register, cache memory, semiconductor memory devices, magnetic media such as internal hard disks and removable disks, magneto-optical media, and optical media such as CD-ROM disks.

Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, or any combination of thereof.

What is claimed is:

1. A method for implementing an energy-aware ABR algorithm for adaptive streaming, the method comprising:
determining whether a buffer level is less than a threshold buffer;
when the buffer level is less than the threshold buffer, selecting a lowest bitrate representation for playback of a segment of a video in a conservative mode;
when the buffer level exceeds the threshold buffer, calculating a cost of a representation for each of a set of bitrates in an operative mode, the cost of the representation comprising a weighted sum of a throughput cost, a buffer cost, a quality cost, and an energy cost;
while in the operative mode, selecting a bitrate from the set of bitrates for a next segment of the video based on the cost of the representation; and
providing to a client device a selected representation based on the selected bitrate, the selected bitrate being the lowest bitrate representation in the conservative mode and the bitrate selected based on the cost of the representation in the operative mode.

2. The method of claim 1, wherein the energy cost is computed as a function of the representation's bitrate, the representation's content resolution, and the representation's frames per second.

3. The method of claim 2, wherein the representation's content resolution comprises a number of pixels of the representation.

4. The method of claim 2, wherein the energy cost is derived from an energy consumption model wherein each of the representation's bitrate, the representation's content resolution, and the representation's frames per second is given a weight based on characteristics of the client device.

5. The method of claim 2, wherein the energy cost is further computed as a function of one, or a combination of, a codec, a device type, and a segment size.

6. The method of claim 5, wherein the device type comprises a property associated with a brightness of a screen of the client device.

7. The method of claim 5, wherein the device type comprises a property associated with a display resolution of the client device.

8. The method of claim 5, wherein the device type comprises a property associated with a network interface of the client device.

9. The method of claim 2, wherein the function comprises a linear function.

10. The method of claim 1, wherein the energy cost comprises an empirical value.

11. The method of claim 1, wherein the throughput cost is computed as a linearly increasing function of the representation's bitrate and a segment duration.

12. The method of claim 1, wherein the buffer cost is computed as a function of a total buffer size, the threshold buffer, a segment duration, and an estimated throughput for downloading the next segment.

13. The method of claim 1, wherein the quality cost comprises one or both of a penalty when the representation's bitrate is lower than the highest bitrate in the set of bitrates, and a penalty if the representation's bitrate is different from an average quality of a set of recent segments.

14. The method of claim 1, wherein the quality cost is computed as an exponential function of a quality of the representation and an average quality of a set of recent segment.

15. The method of claim 1, wherein the conservative mode is implemented in response to a selection of an ECO mode by an ABR application on a client device.

16. The method of claim 1, wherein the energy-aware ABR algorithm is implemented in response to a selection of an ECO mode by an ABR application on a client device, the conservative mode and the operative mode comprising sub-modes of the ECO mode.

17. The method of claim 1, wherein the sum of the weights for the throughput cost, the buffer cost, and the quality cost is set to 1.

18. The method of claim 1, wherein the throughput cost and the buffer cost have the same contribution to the cost of the representation for a highest bitrate representation.

19. The method of claim 1, wherein the set of bitrates in the operative mode comprise bitrates that are less than the highest bitrate for a last throughput with a given margin.

* * * * *